P. L. TRAMBLEY.
PEDAL.
APPLICATION FILED JUNE 18, 1913.
1,091,405.
Patented Mar. 24, 1914.
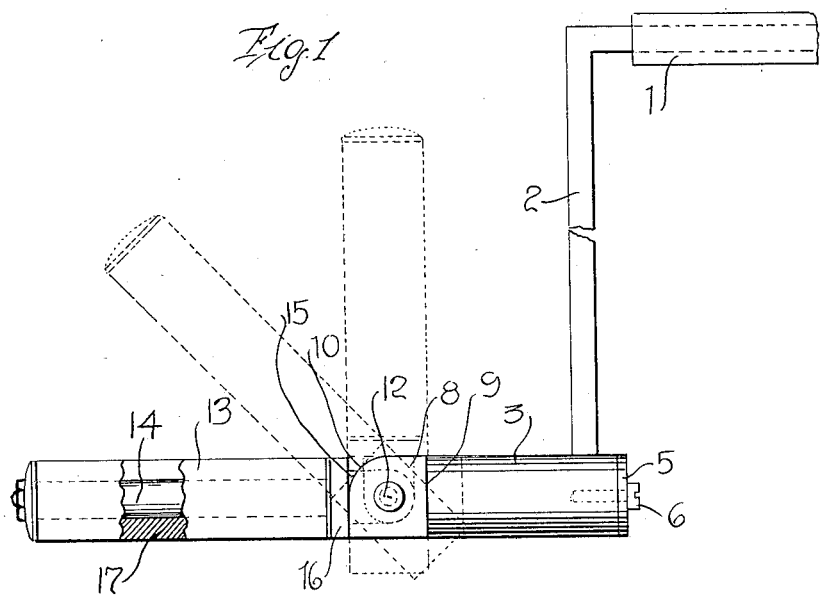
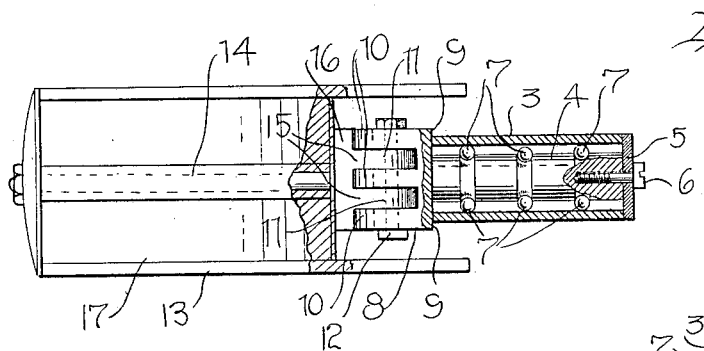
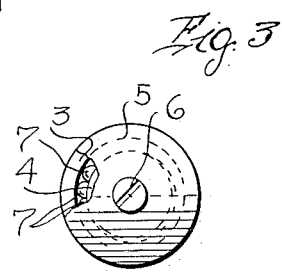
Inventor
PETER L. TRAMBLEY
Witnesses
Robert M. Sutphent
A. J. Hind.
By Watson E. Coleman
Attorney

UNITED STATES PATENT OFFICE.

PETER L. TRAMBLEY, OF ALBUQUERQUE, NEW MEXICO.

PEDAL.

1,091,405.

Specification of Letters Patent.

Patented Mar. 24, 1914.

Application filed June 18, 1913. Serial No. 774,444.

*To all whom it may concern:*

Be it known that I, PETER L. TRAMBLEY, a citizen of the United States, residing at Albuquerque, in the county of Bernalillo and State of New Mexico, have invented certain new and useful Improvements in Pedals, of which the following is a specification, reference being had to the accompanying drawings.

This invention relates to improvements in pedals for motor cycles or the like, and an object thereof is the provision of a pedal which is hingedly connected to the pedal shaft, so that it may be moved out of longitudinal alinement therewith.

Another object of this invention is the provision of a pedal which is hingedly connected to the pedal shaft, whereby the pedal will be moved upwardly upon contact thereof with the ground should the motor cycle or the like fall over, one face of the pedal being weighted so that the heavier face of the pedal is always disposed downwardly when the crank shaft is rotated.

With these and other objects in view, my invention consists in the novel construction, combination and arrangement of parts, to be hereinafter more fully described, claimed and illustrated in the accompanying drawing, in which—

Figure 1 is a side elevation of my device partly in section: Fig. 2 is a top plan view thereof, showing the sleeve and a portion of the pedal shaft in section; and Fig. 3 is an end view of the sleeve with a portion thereof broken away to show the pedal shaft.

Referring more particularly to the drawing, the numeral 1 designates one end of the crank shaft of the motor cycle or bicycle, and 2 one of the cranks, which is provided on its outer extremity with a tubular hanger or sleeve 3, which extends at a right angle with relation to the crank. The pedal shaft 4 projects through the sleeve 3, the inner end of the shaft 4 lying flush with the inner end of the sleeve 3, and a washer 5 is disposed against the inner end of the sleeve, a set screw 6 being passed through the washer into engagement with the inner end of the shaft 4 to maintain the same within the sleeve. The pedal shaft 4 is of a less diameter than the diameter of the bore of the sleeve, so that ball bearings 7 may be disposed between the periphery of the shaft and the inner periphery of the sleeve to reduce friction therebetween. The outer end of the shaft 4 is provided with an enlarged head 8 which forms a shoulder 9 which bears against the outer end of the sleeve 3, to prevent the shaft from moving inwardly through the sleeve. The outer face of the enlarged head of the shaft is beveled, as at 10, and the head is provided with a pair of transverse slots 11 and mounted in the head and extending through the slots is a pin 12.

The pedal 13 is rotatably mounted on the spindle 14, the inner end of the spindle being forked to provide a pair of spaced arms 15 which are pivotally mounted on the pin 12 within the slots 11 of the enlarged head of the pedal shaft. The spindle 14 is provided inwardly of the arms 15 with an outstanding rib 16, the rib being adapted to engage the enlarged head of the pedal shaft to limit the movement of the pedal. The pedal 13 is weighted on one face thereof as at 17, whereby the weighted face of the pedal is normally disposed downwardly, so that the rib 16 engages the outer face of the enlarged head 8, to maintain the spindle 14 in longitudinal alinement with the shaft 4.

In the practical use of my device, the spindle is disposed normally in longitudinal alinement with the shaft 4, and the weighted face of the pedal is disposed downwardly, and it will be seen that if the motor cycle or bicycle upon which the pedal is mounted is thrown over, the pedal upon striking the ground will be moved upwardly to a position at right angles with relation to the pedal shaft, thereby preventing the same from becoming broken. When the motor cycle or bicycle to which the pedals are connected is not in use, the pedals may be moved at right angles to the pedal shafts, whereby the pedals are disposed upwardly so that persons walking beside the motor cycle or bicycle will not be struck by the pedals.

What I claim is:

In combination with a crank arm having an angularly disposed sleeve formed on its free end, a pedal shaft rotatably mounted in said sleeve, one end of said shaft being formed with an enlarged head provided with transversely disposed slots, a pedal member provided with arms extending within the slots of the head, a pivot member directed through such head and arms, and coacting means carried by the pedal member and the head of the shaft for limiting the movement of such shaft relatively to such head.

In testimony whereof I hereunto affix my signature in the presence of two witnesses.

PETER L. TRAMBLEY.

Witnesses:
M. K. WYBLER,
FELIX BUCA.

Copies of this patent may be obtained for five cents each, by addressing the "Commissioner of Patents, Washington, D. C."